US 6,747,717 B2

(12) United States Patent
Moon

(10) Patent No.: US 6,747,717 B2
(45) Date of Patent: Jun. 8, 2004

(54) LIQUID CRYSTAL DISPLAY DEVICE HAVING CHOLESTERIC LIQUID CRYSTAL

(75) Inventor: Jong-Weon Moon, Seoul (KR)

(73) Assignee: LG. Philips LCD Co. Ltd., Seoul (KR)

( * ) Notice: Subject to any disclaimer, the term of this patent is extended or adjusted under 35 U.S.C. 154(b) by 0 days.

(21) Appl. No.: 09/801,645

(22) Filed: Mar. 9, 2001

(65) Prior Publication Data

US 2001/0026335 A1 Oct. 4, 2001

(30) Foreign Application Priority Data

Mar. 9, 2000 (KR) ........................... 2000-11884

(51) Int. Cl.⁷ .............................. G02F 1/1335
(52) U.S. Cl. .......................... 349/97; 349/106
(58) Field of Search ................. 399/106, 110, 399/97, 96

(56) References Cited

U.S. PATENT DOCUMENTS 6,137,456 A * 10/2000 Bhagavatula et al. .......... 345/9
6,621,543 B2 * 9/2003 Moon ......................... 349/115

FOREIGN PATENT DOCUMENTS

| JP | 03-116116 | | 5/1991 |
| JP | 403163521 | * | 7/1991 |
| JP | 404260024 | * | 9/1992 |
| JP | 07-333605 | | 12/1995 |
| JP | 2000-275629 | * | 10/2000 |

* cited by examiner

Primary Examiner—Toan Ton
(74) Attorney, Agent, or Firm—Birch, Stewart, Kolasch & Birch, LLP

(57) ABSTRACT

The invention provides a liquid crystal display device that can improve light efficiency by adopting cholesteric liquid crystal (CLC) as a black matrix and as a polarizer. The cholesteric liquid crystal selectively reflects or transmits the light emitted from the backlight device. Accordingly, the light from the backlight device is converted into a given direction of circularly polarized light by the cholesteric liquid crystal polarizer and enters CLC color filters. Some portion of the circularly polarized light impinges on, and is reflected by, the CLC back matrix and reflected again and again by a reflective plate of the backlight device and by the CLC polarizer. This reflected circularly polarized light finally passes through the CLC polarizer and through the CLC color filters. Therefore, a high brightness, a good contrast and a superior light efficiency are attained.

22 Claims, 3 Drawing Sheets

LIQUID CRYSTAL DISPLAY DEVICE HAVING CHOLESTERIC LIQUID CRYSTAL

CROSS REFERENCE

This application claims the benefit of Korean Patent Application No. 2000-11884, filed on Mar. 9, 2000, which is hereby incorporated by reference.

BACKGROUND OF THE INVENTION

1. Field of the Invention

The present invention relates to a liquid crystal display (LCD) device. And more particularly, it relates to the LCD device having a cholesteric liquid crystal polarizer and cholesteric liquid crystal color filters.

2. Description of Related Art

In general, a liquid crystal display device uses the optical anisotropy and polarization properties of liquid crystal molecules. Because of their peculiar characteristics, the liquid crystal molecules have a definite orientational order in arrangement. The arrangement direction of the liquid crystal molecules can be controlled by an applied electric field. In other words, when electric fields are applied to liquid crystal molecules, the arrangement of the liquid crystal molecules changes. Since incident light is refracted according to the arrangement of the liquid crystal molecules, due to the optical anisotropy of liquid crystal molecules, image data can be displayed.

Of the different types of LCDs, an active matrix LCD (AM-LCD) (having thin film transistors and pixel electrodes are arranged in the form of a matrix) is the majority subject of research and development activity due to its high resolution and superiority in displaying moving images.

FIG. 1 is a cross-sectional view illustrating a related art liquid crystal display (LCD) panel. As shown in FIG. 1, the LCD panel 20 has lower and upper substrates 2 and 4 and an interposed liquid crystal layer 10. The lower substrate 2, which is referred to as an array substrate, has a TFT "S" as a switching element that changes the orientation of the liquid crystal molecules. A pixel electrode 14 applies a voltage to the liquid crystal layer 10 according to the state of the TFT "S". The upper substrate 4 has a color filter 8 for implementing a color and a common electrode 12 on the color filter 8. The common electrode 12 serves as an electrode for applying a voltage to the liquid crystal layer 10. The pixel electrode 14 is arranged over a pixel portion "P", of a display area. Further, to prevent leakage of the liquid crystal layer 10, the two substrates 2 and 4 are sealed using a sealant 6.

In the above-mentioned AM-LCD device, the data signal is applied to the pixel electrode 14 in accordance with the scanning signal of the gate electrode of the TFT "S", i.e., the TFT "S" is turned ON. On the contrary, the data signal is not applied to the pixel electrode 14 when the TFT "S" is turned OFF.

The LCD device is a sort of light modulator and uses light from the backlight device (not shown). However, the LCD device is not efficient because the light generated from the backlight device has to pass through the several layers to display the color images. These several layers are a pair of linear polarizers, color filters, etc.

Especially, since the linear polarizer only transmits a linear component of the light, i.e., the linearly polarized light of the light from the backlight, the density of the light decreases. Namely, less than half of the light passes through the LCD panel such that the LCD device is not efficient at using the light from the backlight device. Therefore, the brightness is degraded. Moreover, the color filters that are used in the LCD device usually absorb the light except for the light having the intrinsic wavelength, and thus the optical density and the brightness is lowered.

For the purpose of solving the aforementioned problems, the light transmissivity of the color filters should be increased. And, for the purpose of raising the light transmissivity, the color purity should be lowered. However, there is a limitation upon decreasing the color purity.

Accordingly, a cholesteric liquid crystal color filter (referred to as CLC color filter hereinafter) and a cholesteric liquid crystal polarizer (referred to as CLC polarizer hereinafter) are researched and applied to the LCD device to improve the brightness. The CLC color filter has characteristics of both the liquid crystal and the color filter. Namely, the CLC color filter selectively reflects or transmits incident light, and selectively displays a certain color. Moreover, it is widely known that using the CLC color filter and CLC polarizer in the LCD device increases the efficiency of the light emitted from the backlight device.

FIG. 2 is a schematic sectional view of a related art LCD device having the CLC color filter and the CLC polarizer. As shown, the LCD device 25 has upper and lower substrates 40 and 30 corresponding to upper and lower substrates 4 and 2 of FIG. 1, and an interposed liquid crystal layer 38. CLC color filters 34 having red (R), green (G) and blue (B) colors are on the lower substrate 30. A black matrix 36 is positioned between the CLC color filters 34 and the lower substrate 30, in the boundary between the CLC color filters 34.

The CLC color filters 34 are color filters made of a cholesteric liquid crystal (CLC). They selectively reflect or transmit incident light. For example, if the molecular structure of the CLC is twisted in the right direction, the CLC reflect only right-handed circularly polarized light. Additionally, objects have an intrinsic wavelength. The color that an observer sees when looking at an object is the wavelength of the light reflected from or transmitted through the object. The wavelength range of visible light is from about 400 nm to 700 nm. Visible light can be broadly divided into red, green, and blue regions. The wavelength of the red light region is centered at about 660 nm, that of green is centered at about 530 nm, and that of blue is centered at about 470 nm. The pitch of the cholesteric liquid crystal is controllable and, therefore it is possible that a CLC color filter can selectively transmit light having the intrinsic wavelength of the color corresponding to a pixel. This enables a pixel to display red (R), green (G) or blue (B) with a high purity. To implement a precise color, a plurality of the CLC color filters can be selectively arranged. Therefore, a CLC color filter can display a selected color better than a conventional absorptive color filter.

Referring to FIG. 2, a backlight device 50 is located under the lower substrate 30. A CLC polarizer 32 is located under the lower substrate 30 and between the backlight device 50 and the lower substrate 30. The backlight device 50 generates artificial light that displays color images in accordance with the color filters 34. The CLC polarizer 32 is a polarizer made of a cholesteric liquid crystal. It reflects or transmits a left- or right-handed circularly polarized light. Therefore, the CLC polarizer 32 passes a much larger amount of light than the linear polarizer. The CLC polarizer 32 is used substantially for changing the phase of the light, i.e., converting the light into the left- or right circularly polarized light. A black matrix 36 that is made of an organic substance or a metallic material is formed on the lower substrate 30.

The black matrix 36 is also arranged in the boundary between the CLC color filters 34 such that it divides the color filters 34 into the displaying areas.

Still referring to FIG. 2, a retardation film 42 and a linear polarizer 46 are formed in series on the upper substrate 40. The retardation film 42, which has a phase difference of $\lambda/4$, respectively converts the circularly polarized light into the linearly polarized light, or the linearly polarized light into the circularly polarized light. The liquid crystal layer 38 is interposed between the upper substrate 40 and the lower substrate 30 and functions as an optical shutter for changing a direction or a phase of the light that is colored by the CLC color filters 34.

As mentioned above, since the CLC polarizer is adopted in the LCD device, the efficiency of the light from backlight device is raised; thereby the brightness of the LCD device increases. Moreover, since the CLC color filter is adopted in the LCD device instead of the absorptive color filter, the tint and color purity increase, compared to the LCD device that has the absorptive color filter.

FIG. 3 is a graph illustrating transmittance after light passes through each layers of a typical LCD device. The two polarizers have a transmittance of 45% and, the two substrates have a transmittance of 94%. The TFT array and the pixel electrode have a transmittance of 65%, and the color filter has a transmittance of 27%. Therefore, the typical LCD device has a transmittance of about 7.4% as seen in FIG. 3, which shows a transmittance (in relative brightness %) after light passes through each layer of the device.

In general, with respect to the LCD device, the pixel electrode is required to operate the liquid crystal layer, the TFT as a switching device, plural signal lines applying signals to the TFT, etc. Among them, the displaying portion is substantially an area where the pixel electrode is positioned. And the area except the displaying portion is covered with the black matrix.

If the aperture ratio of the LCD device is 40%, about 60% of the light from the backlight device is shielded by the black matrix. Therefore, for the purpose of the high brightness, the light from the backlight device should initially be much brighter, thereby electric power consumption by the backlight device increases.

In order to overcome the problem described above, the battery of the LCD device used for the portable computer has a high electric power consumption. So a relatively heavy battery is needed to supply a sufficient power to the backlight device. However, this has a problem that the battery cannot be used for a lengthy period of time. Moreover, when using an organic substance as a black matrix, the organic black matrix absorbs the light, and thus the light efficiency is reduced. When using a metallic material as a black matrix, the light is reflected by the metallic black matrix and then reflected again by the CLC polarizer, and thus the contrast of the LCD device is deteriorated.

SUMMARY OF THE INVENTION

Accordingly, the present invention is directed to a liquid crystal display device that substantially obviates one or more of the problems due to limitations and disadvantages of the related art.

To overcome the problems described above, an object of the present invention is to provide a liquid crystal display device having cholesteric liquid crystal as a black matrix.

Another aspect of the present invention is to provide a, liquid crystal display device that increases efficiency in the use of the light from the backlight device.

To achieve these and other advantages and in accordance with the purposes of the present invention, as embodied and broadly described, there is provided an LCD device that includes first and second substrates facing and spaced; apart from each other; a liquid crystal layer interposed between the first and second substrates; (optionally) a retardation film formed on the first substrate and on the opposite side of the liquid crystal layer; (optionally) a second polarizer formed on the retardation film; a first polarizer formed under the second substrate and on the opposite side of the liquid crystal layer, the first polarizer made of cholesteric liquid crystal; color filters formed on the second substrate and facing the first substrate, wherein each color filter has one of a plurality of primary colors, e.g., red, green and blue; a black matrix formed in the boundaries between the color filters, wherein the black matrix is on the second substrate, and wherein the black matrix is made of the same material as the second polarizer; and a backlight device arranged under the second substrate.

The color filters are beneficially made of the cholesteric liquid crystal, and the black matrix reflects the light that passes through the first polarizer. The first polarizer transmits the light that is reflected by the black matrix.

To achieve the above aspects, in another aspect, the present invention provides an LCD device. That device includes first and second substrates facing each other and spaced apart from each other; a liquid crystal layer interposed between the first and second substrates; (optionally) a retardation film formed on the first substrate and on the opposite side of the liquid crystal layer; (optionally) a second polarizer formed on the retardation film; a first polarizer formed on the second substrate and facing the liquid crystal layer, the first polarizer made of cholesteric liquid crystal; color filters formed on the first polarizer and facing the first substrate, wherein each color filter has one of a plurality of primary colors, e.g., red, green and blue; a black matrix formed in the boundaries between the color filters, wherein the black matrix is on the second polarizer, and wherein the black matrix is made of the same material as the second polarizer; and a backlight device arranged under the second substrate.

To achieve the above aspects, in another aspect, the present invention provides an LCD device. That device includes a backlight device irradiating light; a polarizer converting the light from the backlight device into a first circularly polarized light, the polarizer made of cholesteric liquid crystal; color filters coloring the first circularly polarized light one of a plurality of primary colors, e.g., red, green and blue; a black matrix formed in the boundary between the color filters, wherein the first circularly polarized light is reflected by the black matrix and then passes through the polarizer; and a reflective plate formed in the backlight device; wherein the first circularly polarized light reflected by the black matrix and passing through the polarizer is converted as it reflected by the reflective plate of the backlight device into the second circularly polarized light; wherein the second circularly polarized light is reflected by the polarizer and reaches the reflective plate; wherein the second circularly polarized light reflected by the polarizer is converted into the first circularly polarized light, and then the first circularly polarized light passes through the polarizer and through the color filters.

The black matrix is beneficially made of the same material as the polarizer, and the first circularly polarized light is a left-handed circularly polarized light or a right-handed circularly polarized light.

It is to be understood that both the foregoing general description and the following detailed description are exemplary and explanatory and are intended to provide further explanation of the invention as claimed.

The accompanying drawings are included to provide a further understanding of the invention and are incorporated in and constitute a part of this specification, illustrate one embodiment of the invention and together with the description serve to explain the principles of the invention.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to an illustrated embodiment of the present invention, an example of which is shown in the accompanying drawings.

Figure 4:
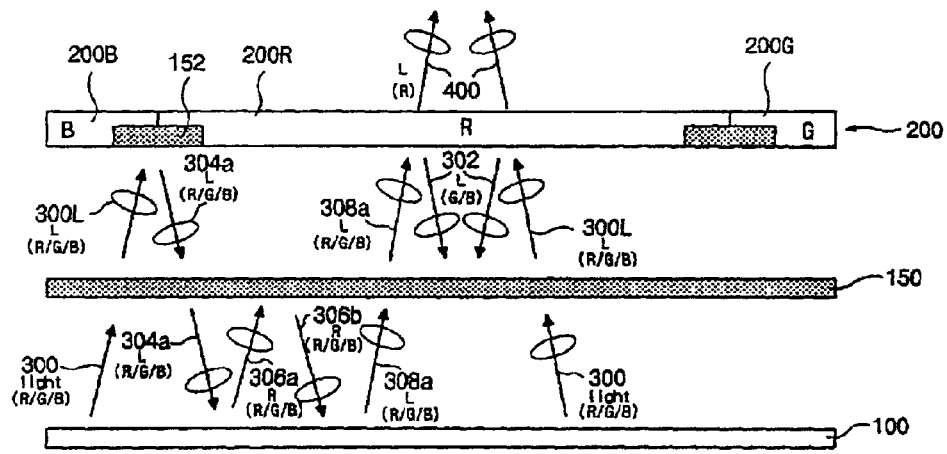
FIG. 4 is a more detailed schematic view of light from a backlight device passing through selected components of the LCD device of FIGS. 5 and 6.

FIG. 4 is a more detailed schematic view of light from a backlight device passing through selected components of the LCD device according to a preferred embodiment of the invention. As shown, a reflective plate 100 reflects the light emitted from the backlight device (not shown). A CLC polarizer 150 is formed over the reflective plate 100. CLC color filters 200 that are red (R), blue (B) and green (G) are formed over the CLC polarizer 150. A black matrix 152 is formed in the boundary between the CLC color filters 200B, 200R and 200G. So the black matrix 152 divides the CLC color filters 200 into each colored CLC color filters 200B, 200R and 200G. Moreover, the black matrix 152 is formed of the same material as the CLC polarizer 150, i.e., the cholesteric liquid crystal (CLC).

As described before, the reflective plate 100 reflects the light radiated from the backlight device, and the CLC polarizer 150 converts the light from the backlight device into left- or right-handed circularly polarized light. In this embodiment, the CLC polarizer 150 converts the light into the left-handed circularly polarized light, i.e., the CLC polarizer transmits the left-handed circularly polarized light and reflects the right-handed circularly polarized light. The CLC color filters 200 include a red CLC color filter 200R, a blue CLC color filter 200B and a green CLC color filter 200G. An alternate set of primary color filters could be used. The black matrix 152 is positioned in the boundary portion of each CLC color filter.

This black matrix 152 is made of the cholestric liquid crystal, but reflects the left-handed circularly polarized light and it transmits the right-handed circularly polarized light on the contrary to the CLC polarizer 150. In other words the cholesteric liquid crystal is used for both the CLC polarizer 150 and the black matrix 152 according to the principles of the present invention, but the CLC polarizer 150 serves as transmitting the left-handed circularly polarized light and the black matrix 152 serves as reflecting the left-handed circularly polarized light.

An operating principle of the LCD device will be explained hereinafter. Referring to FIG. 4, light 300 generated from the backlight device (not shown) passes through the CLC polarizer 150. At this time, the light 300 has the red, blue and green wavelengths and the light 300 is converted into the left-handed circularly polarized light 300L. The left-handed circularly polarized light 300L has two ways of passing through the components of the LCD device. The first way is that the left-handed circularly polarized light 300L directly reaches the CLC color filters 200. The second way is that the left-handed circularly polarized light 300L reaches the black matrix 152.

In the first way of passing through the componets of the LCD device, the light 300 having the red, green and blue wavelengths is converted as it passes through the CLC polarizer 150 into the left-handed circularly polarized light 300L. This left-handed circularly polarized light 300L passes through the color filters 200. When the left-handed circularly polarized light 300L reaches the red CLC color filter 200R, only the red portion passes through the red CLC color filter 200R. The green- and blue-light 302 of the left-handed circularly polarized light 300L are reflected by the red CLC color filter 200R. The red portion leaves the red CLC color filter 200R as red left-handed circularly polarized light 400.

In the second way of passing through the componets of the LCD device, the light 300 having red, green and blue wavelengths is converted as it passes through the CLC polarizer 150 into the left-handed circularly polarized light 300L. This left-handed circularly polarized light 300L reaches the black matrix 152 and then it is reflected by the black matrix 152. This reflected left-handed circularly polarized light 304a then re-enters the CLC polarizer 150. The reflected left-handed circularly polarized light 304a passes through the CLC polarizer 150 without any polarzation shift. Then this left-handed circularly polarized light 304a is reflected by the refelective plate 100, and it is then converted into right-handed circularly polarized light 306a via mirror effect. The right-handed circularly polarized light 306a is reflected by the CLC polarizer 150. The reflected right-handed circularly polarized light 306b is then reflected by the reflective plate 100 and converted into left-handed circularly polarized light 308a via mirror effect.

Still referring to FIG. 4, the left-handed circularly polarized light 308a passes through the CLC polarizer 150 and through the CLC color filters 200. When the left-handed circularly polarized light 308a reaches the red CLC color filter 200R, only the red portion passes through the red CLC color filter 200R. The green- and blue-light 302 of the left-handed circularly polarized light 300L are reflected by the red CLC color filter 200R. The red portion leaves the red CLC color filter 200R as red left-handed circularly polarized light 400.

As described above, since all of the light generated from the backlight device can pass through the color filters, the light efficiency is improved. Theoretically, the light efficiency can be 100%.

In accordance with the preferred embodiment of the present invention, the black matrix is made of the cholesteric liquid crystal such that the black matrix reflects the light. And thus, the reflected light finally reaches and passes the color filters. Meanwhile, the black matrix is made of the same material as the CLC polarizer, i.e., cholesteric liquid crystal. However, the black matrix has a different characteristic from the CLC polarizer. If the CLC polarizer reflects the right-handed circularly polarized light, the black matrix reflects the left-handed circularly polarized light. On the contrary, if the CLC polarizer reflects the left-handed circularly polarized light, the black matrix reflects the right-handed circularly polarized light. In other words, the CLC polarizer and the black matrix transmits or reflects, respectively, a given polarization (e.g., left) of the light from the backlight device. Moreover, each CLC color filter selectively reflects or transmits the given polarization of the light having red, green and blue wavelengths.

Figure 1:
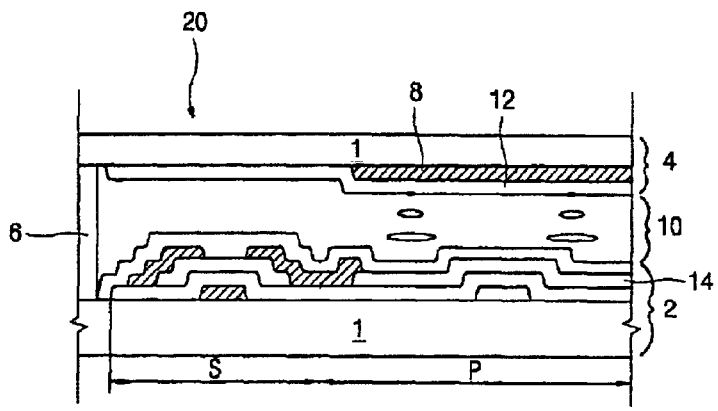
FIG. 1 is a cross-sectional view illustrating a related art liquid crystal display (LCD) panel.
Figure 2:
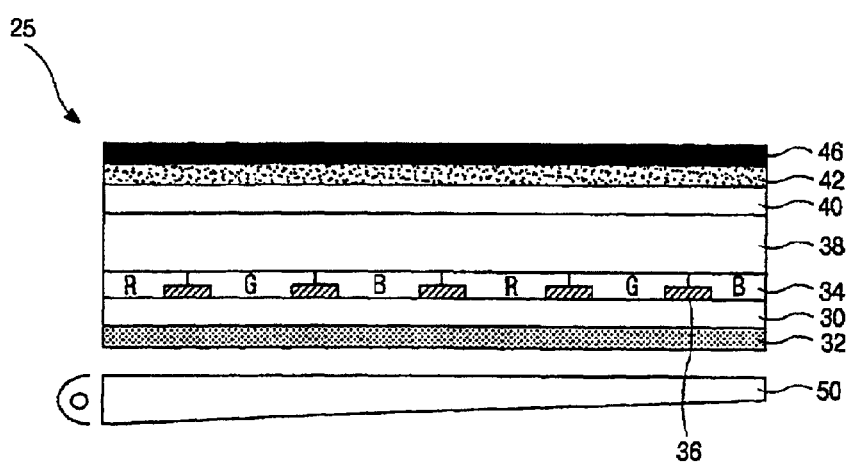
FIG. 2 is a schematic sectional view of a related art LCD device having the CLC color filter and the CLC polarizer.
Figure 3:
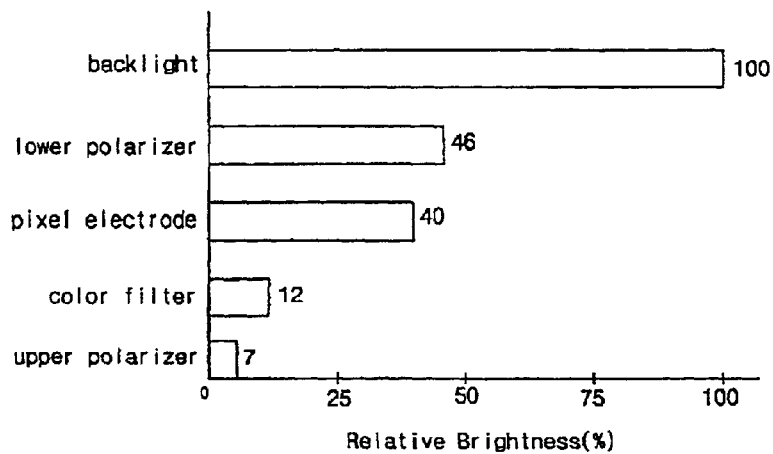
FIG. 3 is a graph illustrating transmittance after light passes through each layers of the related art LCD device.
Figure 5:
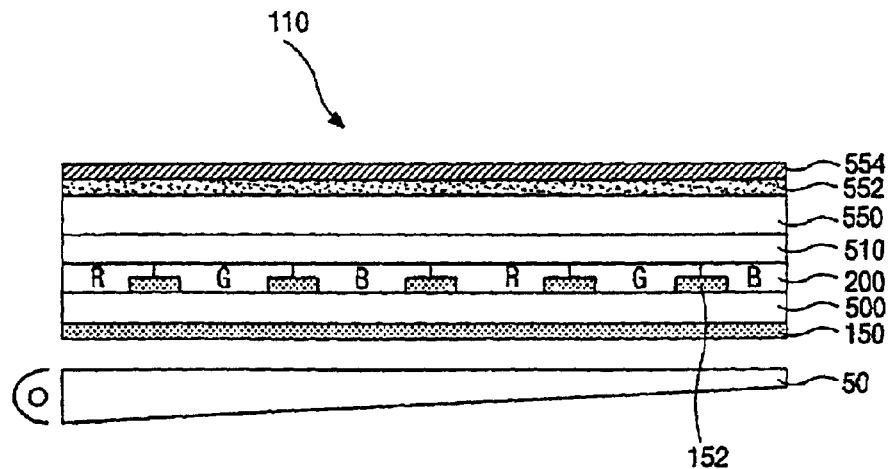
FIG. 5 is a schematic sectional view of an LCD device according to a first embodiment.

FIG. 5 is a schematic sectional view of an LCD device having, a CLC color filters, a CLC polarizer and a black matrix made of the CLC, according to a first embodiment. Compared to the related art described in FIGS. 1–2, the structure of the LCD device 110 is similar, but the cholesteric liquid crystal (CLC) is used for a black matrix 152. As shown in FIG. 5, the LCD device 110 has upper and lower substrates 550 and 500, and an interposed liquid crystal layer 510. CLC color filters 200 having red (R), green (G) and blue (B) colors are on the lower substrate 500. A black matrix 152 is positioned between the CLC color filters 200 and on the lower substrate 500, in the boundary between the CLC color filters 200. A backlight device 50 is located under the lower substrate 500. A CLC polarizer 150 is located under the lower substrate 500 and between the backlight device 50 and the lower substrate 500.

Still referring to FIG. 5, a retardation film 552 and a linear polarizer 554 are formed in series on the upper substrate 550. The retardation film 552, which has a phase difference of $\lambda/4$, respectively converts the circularly polarized light into the linearly polarized light, or the linearly polarized light into the circularly polarized light. The liquid crystal layer 510 is interposed between the upper substrate 550 and the lower substrate 500 and functions as an optical shutter for changing a direction or a phase of the light that is colored by the CLC color filters 200.

Meanwhile, as mentioned before, the CLC color filters 200 are color filters made of the cholesteric liquid crystal, and the CLC color filters 200 selectively reflect and transmit a certain wavelength of the light. Moreover, the black matrix 152 and the CLC polarizer 150 that are also made of the cholesteric liquid crystal control the broadband wavelength of the light. The light-transmitting or light-reflecting characteristic of the black matrix 152 is different from that of the CLC polarizer 150. Namely, the black matrix 152 reflects the left-handed circularly polarized light if the CLC polarizer 150 reflects the right-handed circularly polarized light, and vice versa. In other words, the black matrix 150 and the CLC polarizer 152 reflect or transmit the oppositely circularly polarized light.

Figure 6:
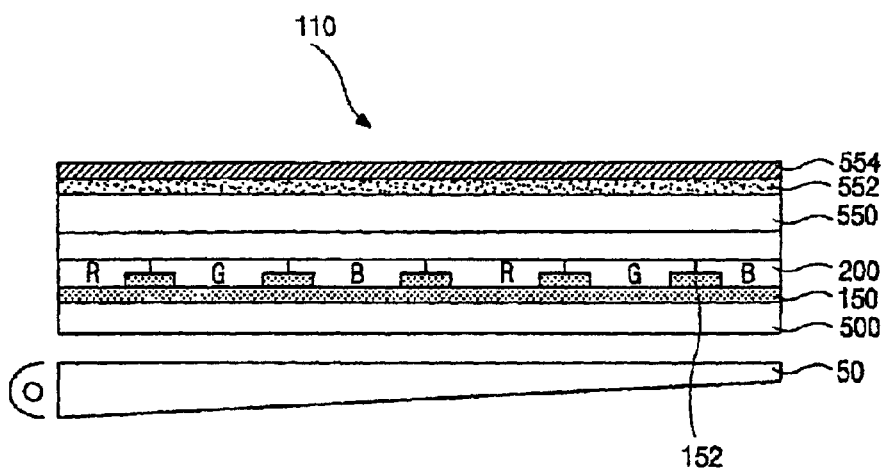
FIG. 6 is a schematic sectional view of an LCD device according to a second embodiment.

Hereinafter, the reference will now be made in detail to illustrate a second embodiment of the present invention, an example of which is shown in the accompanying drawing, FIG. 6.

The second embodiment of the present invention is similar to the first embodiment, except that the CLC polarizer is located in a different position as compared to the first embodiment described in FIG. 5. Referring to FIG. 6, the LCD device 110 has upper and lower substrates 550 and 500, and an interposed liquid crystal layer 510. A CLC polarizer 150 is formed on the lower substrate 500. CLC color filters 200 having red (R), green (G) and blue (B) colors are on the CLC polarizer 500. A black matrix 152 is positioned between the CLC color filters 200 and on the CLC polarizer 150, in the boundary between the CLC color filters 200. A backlight device 50 is located under the lower substrate 500. A retardation film 552 and a linear polarizer 554 are formed in series on the upper substrate 550. The liquid crystal layer 510 is interposed between the upper substrate 550 and the lower substrate 500 and functions as an optical shutter for changing a direction or a phase of the light that is colored by the CLC color filters 200.

As described above, because the cholesteric liquid crystal that selectively has a reflection or tranmittion characteristic is used for the black matrix, the back light efficiency is raised.

Accordingly, the LCD device of the illustrated embodiments has the following advantages.

First, since the cholesteric liquid crystal is used as the black matrix, efficiency in the use of the light emitted from the backlight device increases, and thus the high brightness is obtained in the LCD device.

Second, since a relatively lower power consumption is achieved for a comparably bright LCD device, the LCD device can be adopted in the portable computer or in other carried devices.

Third, due to the black matrix made of cholesteric liquid crystal, the light reflected by the black matrix is not reflected again on the CLC polarizer, and thus the contrast of the LCD device increases.

While the invention has been particularly shown and described with reference to an illustrated embodiment thereof, it will be understood by those skilled in the art that the foregoing and other changes in form and details may be made therein without departing from the spirit and scope of the invention.

What is claimed is:

1. A liquid crystal display device, comprising:
   first and second substrates facing and spaced apart from each other;
   a liquid crystal layer interposed between the first and second substrates;
   a first polarizer formed under the second substrate and on the opposite side relative to the liquid crystal layer, the first polarizer being made of cholesteric liquid crystal;
   color filters formed on the second substrate and facing the first substrate, wherein each color filter has one of a plurality of primary colors;
   a black matrix formed in the boundaries between the color filters, wherein the black matrix is on the second substrate, and wherein the black matrix is made of the same material as the first polarizer; and
   a backlight device arranged under the second substrate.

2. The liquid crystal display device according to claim 1, wherein the color filters are made of the cholesteric liquid crystal.

3. The liquid crystal display device according to claim 1, wherein the black matrix reflects the light that passes through the first polarizer.

4. The liquid crystal display device according to claim 3, wherein the first polarizer transmits the light that is reflected by the black matrix.

5. A liquid crystal display device, comprising:
   first and second substrates facing each other and spaced apart from each other;

a liquid crystal layer interposed between the first and second substrates;

a first polarizer formed on the second substrate and facing the liquid crystal layer, the first polarizer being made of cholesteric liquid crystal;

color filters formed on the first polarizer and facing the first substrate, wherein each color filter has one of a plurality of primary colors;

a black matrix formed in the boundaries between the color filters, wherein the black matrix is on the first polarizer, and wherein the black matrix is made of the same material as the first polarizer; and a backlight device arranged under the second substrate.

6. A liquid crystal display device according to claim 5, wherein the color filters are made of the cholesteric liquid crystal.

7. A liquid crystal display device according to claim 5, wherein the black matrix reflects the light that passes through the first polarizer.

8. A liquid crystal display device according to claim 7, wherein the first polarizer transmits the light that is reflected by the black matrix.

9. A liquid crystal display device, comprising:

a backlight device irradiating light;

a polarizer converting the light from the backlight device into a first circularly polarized light, the polarizer being made of cholesteric liquid crystal;

color filters coloring the first circularly polarized light into one of a plurality of primary colors;

a black matrix formed in the boundary between the color filters, wherein the first circularly polarized light is reflected by the black matrix and then passes through the polarizer; and a reflective plate formed in the backlight device, wherein the first circularly polarized light reflected by the black matrix and passing through the polarizer is converted as it reflected by the reflective plate of the backlight device into the second circularly polarized light, wherein the second circularly polarized light is reflected by the polarizer and reaches the reflective plate, wherein the second circularly polarized light reflected by the polarizer is converted into the first circularly polarized light, and then the first circularly polarized light passes through the polarizer.

10. A liquid crystal display device according to claim 9, wherein the black matrix is made of the same material as the polarizer.

11. A liquid crystal display device according to claim 9, wherein the first circularly polarized light is a left-handed circularly polarized light.

12. A liquid crystal display device according to claim 9, wherein the first circularly polarized light is a right-handed circularly polarized light.

13. The liquid crystal display device according to claim 1, further comprising:

a retardation film formed on the first substrate and on the opposite side relative to the liquid crystal layer; and a second polarizer formed on the retardation film.

14. The liquid crystal display device according to claim 1, wherein said primary colors are red, blue and green.

15. The liquid crystal device according to claim 5, further comprising:

a retardation film formed on the first substrate and on the opposite side of the liquid crystal layer; and a second polarizer farmed on the retardation film.

16. The liquid crystal device according to claim 5, wherein said primary colors are red, blue and green.

17. The liquid crystal device according to claim 9, wherein said primary colors are red, blue and green.

18. A liquid crystal display device, comprising:

first and second substrates facing and spaced apart from each other;

a liquid crystal layer interposed between the first and second substrates;

a first polarizer formed under the second substrate and on the opposite side relative to the liquid crystal layer, the first polarizer being made of cholesteric liquid crystal;

color filters formed on the second substrate and facing the first substrate, wherein each color filter has one of a plurality of primary colors;

a black matrix formed in the boundaries between the color filters, wherein the black matrix is on the second substrate, and wherein the black matrix is made of the same material as the first polarizer; and a backlight device arranged under the second substrate, wherein the first polarizer reflects right-handed circularly polarized light and the black matrix reflects left-handed circularly polarized light.

19. A liquid crystal display device, comprising:

first and second substrates facing and spaced apart from each other;

a liquid crystal layer interposed between the first and second substrates;

a first polarizer formed under the second substrate and on the opposite side relative to the liquid crystal layer, the first polarizer being made of cholesteric liquid crystal;

color filters formed on the second substrate and facing the first substrate, wherein each color filter has one of a plurality of primary colors;

a black matrix formed in the boundaries between the color filters, wherein the black matrix is on the second substrate, and wherein the black matrix is made of the same material as the first polarizer; and a backlight device arranged under the second substrate, wherein the first polarizer reflects left-handed circularly polarized light and the black matrix reflects right-handed circularly polarized light.

20. The liquid crystal display device according to claim 18, wherein left-handed circularly polarized light passes through the first polarizer, the left-handed circularly polarized light is reflected by the black matrix, the left-handed circularly polarized light passes through the first polarizer without any polarization shift, the left-handed polarized light is reflected by a reflector and converted to right-handed circularly polarized light, the right-handed circularly polarized light is reflected by the first polarizer, and the right-handed circularly polarized light is reflected by the reflector and converted to left-handed circularly polarized light.

21. The liquid crystal display device according to claim 1, wherein the black matrix has 1 layer.

22. A liquid crystal display device, comprising:

first and second substrates facing and spaced apart from each other;

a liquid crystal layer interposed between the first and second substrates;

a polarizer formed under the second substrate and on the opposite side relative to the liquid crystal layer, the polarizer being made of cholesteric liquid crystal;

color filters formed on the second substrate and facing the first substrate, wherein each color filter has one of a plurality of primary colors;

a black matrix formed in the boundaries between the color filters, wherein the black matrix is on the second substrate, and wherein the black matrix is made of the same material as the polarizer; and a backlight device arranged under the second substrate, wherein light from the backlight device interplays with the polarizer and the black matrix to improve light efficiency.

* * * * *